US011673199B2

(12) United States Patent
Krabichler et al.

(10) Patent No.: US 11,673,199 B2
(45) Date of Patent: Jun. 13, 2023

(54) MILLING METHOD AND USE OF A CUTTING INSERT

(71) Applicant: CERATIZIT AUSTRIA GESELLSCHAFT M.B.H., Reutte (AT)

(72) Inventors: Markus Krabichler, Reutte (AT); Peter Burtscher, Reutte (AT)

(73) Assignee: CERATIZIT Austria Gesellschaft m.b.H., Reutte (AT)

( * ) Notice: Subject to any disclaimer, the term of this patent is extended or adjusted under 35 U.S.C. 154(b) by 177 days.

(21) Appl. No.: 16/620,108

(22) PCT Filed: May 22, 2018

(86) PCT No.: PCT/AT2018/000048
§ 371 (c)(1),
(2) Date: Dec. 6, 2019

(87) PCT Pub. No.: WO2018/223159
PCT Pub. Date: Dec. 13, 2018

(65) Prior Publication Data

US 2020/0246883 A1 Aug. 6, 2020

(30) Foreign Application Priority Data

Jun. 6, 2017 (AT) .................................. A 127/2017

(51) Int. Cl.
*B23C 3/18* (2006.01)
*B23C 5/20* (2006.01)

(52) U.S. Cl.
CPC ................ *B23C 3/18* (2013.01); *B23C 5/202* (2013.01); *B23C 2200/0444* (2013.01);
(Continued)

(58) Field of Classification Search
CPC ... B23C 1/12; B23C 2220/04; B23C 2220/48; B23C 2220/44; B23C 2220/00; B23C 3/18; B23C 5/109; B23C 5/20; B23C 5/207; B23C 5/202; B23C 2215/44; B23C 2210/60; B23C 2200/04; B23C 2200/0433; B23C 2200/0438; B23C 2200/0444
See application file for complete search history.

(56) References Cited

U.S. PATENT DOCUMENTS 4,031,809 A * 6/1977 Shraiman ................. B23C 3/18
409/84
4,624,610 A 11/1986 Phillips et al.
(Continued)

FOREIGN PATENT DOCUMENTS

AT 12004 U1 9/2011
CH 661678 A5 * 8/1987 .............. B23C 3/18
(Continued)

*Primary Examiner* — Ryan Rufo
(74) *Attorney, Agent, or Firm* — Laurence A. Greenberg; Werner H. Stemer; Ralph E. Locher

(57) ABSTRACT

A method for milling a workpiece by way of at least one substantially polygonal cutting insert, which is arranged in a tool holder. A spindle axis of the tool holder encloses an angle of more than 0° with a plane normal to a machined workpiece surface. An effective lead angle between a main cutting edge of the cutting insert and the machined workpiece surface lies between 0° and 20°.

3 Claims, 4 Drawing Sheets

R
γ
S
F
2
5
$N_S$
4
$K_{eff}$
N
1
Detail A

(52) U.S. Cl.
CPC ................. *B23C 2200/0461* (2013.01); *B23C 2200/0483* (2013.01); *B23C 2200/203* (2013.01); *B23C 2210/0407* (2013.01); *B23C 2215/44* (2013.01); *B23C 2220/04* (2013.01)

(56) References Cited

U.S. PATENT DOCUMENTS 4,850,761 A 7/1989 Breuer et al.
5,033,916 A * 7/1991 Dunklau ................. B23C 5/207 407/33
6,196,771 B1 * 3/2001 Andersson ............ B23C 5/2479 407/113
8,974,156 B2 3/2015 Burtscher
2003/0002929 A1 * 1/2003 Nagashima ............... B23C 5/06 407/113
2005/0019109 A1 * 1/2005 DeRoche ................ B23C 5/202 407/34
2005/0084342 A1 * 4/2005 Festeau ..................... B23C 5/06 407/113
2008/0260475 A1 * 10/2008 Bodewig ................. B23C 5/207 407/42
2008/0298917 A1 * 12/2008 Chang ..................... B23C 5/202 408/226
2010/0028092 A1 * 2/2010 Choi ....................... B23C 5/202 407/40
2011/0027025 A1 2/2011 Horiike et al.
2013/0272813 A1 * 10/2013 Bichsel ..................... B23C 1/08 409/132
2014/0161545 A1 * 6/2014 Inagaki ............... B23B 27/1603 407/42
2014/0271012 A1 * 9/2014 Hughes ..................... B23C 5/06 409/234
2016/0175946 A1 * 6/2016 Saraie ....................... B23C 5/06 409/131
2018/0065195 A1 * 3/2018 Riviere ................... B23C 5/202

FOREIGN PATENT DOCUMENTS

DE 3344477 A1 1/1985
DE 19607192 A1 * 1/1997 ............... B23C 3/00
EP 0264673 A1 4/1988
EP 2022584 A1 2/2009
EP 3034216 A1 6/2016
JP 2007229849 A * 9/2007

* cited by examiner

MILLING METHOD AND USE OF A CUTTING INSERT

BACKGROUND OF THE INVENTION

Field of the Invention

The invention relates to a milling method with for milling a workpiece with a cutting insert.

So-called high feed cutting has become widely adopted for efficient machining in the creation of flat and shaped surfaces. High feed cutting is milling with relatively slight cutting depth and high feed rates. The cutting depth is limited by a small lead angle. The lead angle is the angle between the main blade of the cutting insert (generally an indexable insert) and the workpiece surface.

Typical feed rates in this method lie on the order of magnitude of 0.7 to 3 mm/tooth, the axial cutting depths $a_p$ are typically less than 2 mm.

The spindle during high feed cutting stands perpendicular to the machined workpiece surface. It is advantageous that the cutting forces occur principally in the axial direction of the tool. The cutting forces are transmitted along the spindle axis and thus along an especially rigid direction toward the tool.

The cutting inserts used for this are typically triangular or quadrangular indexable inserts. A typical indexable insert for high feed cutting is shown for example in AT12004U1. Usual lead angles in high feed cutting are less than 20°.

High feed cutting is generally used to create plane surfaces on flat workpieces.

The problem which the present invention proposes to solve is to indicate a milling method with which the benefits of high feed cutting can be applied to the machining of curved surfaces.

The problem is solved with a method having the features as claimed. Advantageous embodiments are indicated in the dependent claims.

For the machining of complex shaped workpieces such as turbine blades, it is customary to tilt the spindle axis of the milling cutter with respect to the machined workpiece surface. This tilting or slanting of the spindle axis is also known as camber and it occurs in the feed direction, i.e., such that the spindle axis of the milling cutter makes an angle of more than 0° with a plane normal (a normal vector) of the machined workpiece surface. The angle is thus defined to be positive in the feed direction. The slanting of the spindle axis is necessary in order to follow complex surface contours and to free up the straight cutting inserts of the milling cutter which are not in engagement. The machining is done with round plate milling cutters, ball head milling cutters, or ball shaft milling cutters made of solid carbide.

SUMMARY OF THE INVENTION

According to the invention, a method is provided for milling a workpiece by means of at least one substantially polygonal cutting insert, which is arranged in a tool holder, wherein a spindle axis of the tool holder makes an angle of more than 0° to a plane normal to the machined workpiece surface, wherein a lead angle between a main cutting edge of the cutting insert and the machined workpiece surface is between 5° and 20°.

A substantially polygonal base shape means that the cutting insert has a basic shape of a polygon, possibly with rounded outer contour.

Due to the tilting of the spindle axis of the milling cutter in the feed direction, the lead angle between the main cutting edge of the cutting insert and the workpiece surface is decreased. Given a usual installation position of the cutting insert on the tool holder for high feed cutting, this would reduce the maximum achievable axial cutting depth of the cutting insert so much that an economical milling would no longer be possible.

As a remedy, it is proposed to modify the positioning of the cutting edge of the cutting insert on the milling cutter so that it compensates for the slanted position of the spindle axis.

The proposed method makes it possible to employ cutting inserts with polygonal base shape for high feed cutting even in applications with a tilted spindle axis.

In other words, according to the invention a tool-inherent lead angle which is too large, and thus would be unsuitable, for high feed cutting is chosen. By tool-inherent or theoretical lead angle is meant the lead angle which occurs between a cutting edge and the workpiece surface for an untilted spindle axis (i.e., 90° between spindle axis and workpiece surface).

Only by the inclining of the spindle axis is an effective lead angle achieved at the workpiece, allowing a high feed cutting on complex shaped workpieces such as turbine blades.

Preferably it is provided that the cutting insert is inserted in the tool holder in such a way that a theoretical (tool-inherent) lead angle between 20° and 40° exists between a normal to the spindle axis and the main cutting edge of the cutting insert. In other words, when the spindle axis is positioned perpendicular to a machined workpiece surface, a theoretical (tool-inherent) lead angle between 20° and 40° exists between this and the main cutting edge of the cutting insert.

Preferably it is provided that the at least one cutting insert is configured as a substantially triangular or a substantially quadrangular or a substantially pentagonal indexable insert. “Substantially” means here that the base shape of the cutting insert is triangular, quadrangular, or polygonal. This also includes deviations from the strict geometrical definition of a triangle, quadrangle or pentagon.

Generally the cutting inserts in a top view have a rounded shape of an equilateral triangle or a rounded shape of a square or a rounded shape of a regular pentagon. The side edges—on which the cutting edges are formed—are curved outward in convex manner. A radius of curvature of a main cutting edge is preferably at least 1.5 times greater than a radius of an inscribed circle of the contour of the cutting insert in top view.

Whereas in the case of round plates an inclination of the spindle axis produces no change in the lead angle of the cutting edge relative to the workpiece, a tilting of the spindle axis when using cutting inserts with polygonal base shape results in a changing of the lead angle of the cutting edge. Now, if cutting inserts with polygonal base shape are oriented on the tool holder in such a way that conditions for a high feed cutting exist when the spindle axis is perpendicular to the machined workpiece surface, this suitability is lost by tilting the spindle axis.

The method according to the invention makes it possible to now use triangle, quadrangle or pentagon plates instead of the previously typical round plates for milling jobs with inclined spindle axis.

Preferably it is provided that the angle between the spindle axis and the plane normal is between 3° and 35°, further preferably between 10° and 30°, especially preferably between 15° and 25°.

Preferably an axial cutting depth ($a_p$) is less than 3.0 mm, preferably less than 2.50 mm.

Preferably a feed per tooth ($f_z$) is between 0.60 and 0.90 mm.

The method is especially suitable for milling operations on turbine blades: the complex shape of turbine blades generally requires a pronounced slanting position of the spindle axis of the milling cutter used. The method is especially suited to the machining of the blade body and for making receiving grooves at the blade root.

Protection is also sought for a use of a substantially polygonal cutting insert for a machining of a workpiece, wherein the cutting insert is arranged in a tool holder, which tool holder can rotate about a spindle axis, and the spindle axis of the tool holder makes an angle of more than 0° to a plane normal to a machined workpiece surface.

In the use of the cutting insert it is preferably provided that the cutting insert is installed in the tool holder such that a theoretical lead angle between 20° and 40° exists between a normal to the spindle axis and a main cutting edge of the cutting insert.

Preferably the cutting insert is configured as a substantially triangular or a substantially quadrangular or a substantially pentagonal indexable insert.

Preferably the angle between the spindle axis and the plane normal is between 3° and 35°.

Preferably the machining is a high feed cutting with an axial cutting depth $a_p$ less than 3.0 mm, further preferably 2.50 mm. Preferably a feed per tooth $f_z$ is provided between 0.60 and 0.90 mm.

BRIEF DESCRIPTION OF THE SEVERAL VIEWS OF THE DRAWING

The invention shall be explained more closely in the following by figures. There are shown.

DESCRIPTION OF THE INVENTION

Figure 1A:
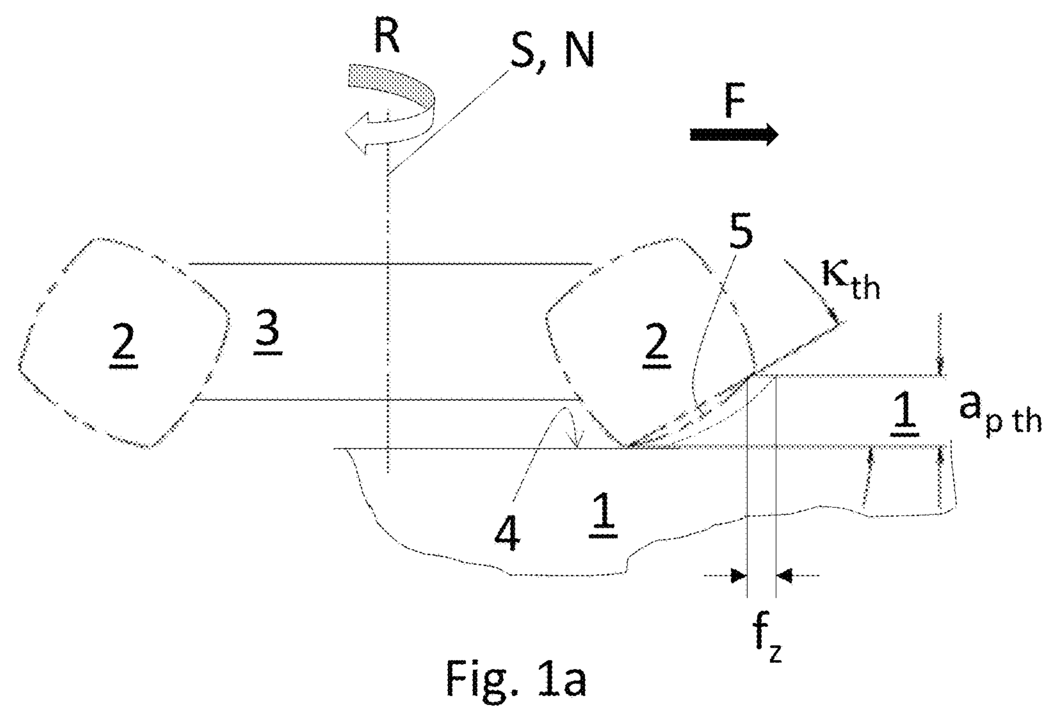
FIG. 1*a*-1*b* schematic representations of tool holders with cutting inserts FIG. 2 a diagram of lead angles for a round cutting insert FIG. 3*a*-3*c* polygonal cutting inserts in top view FIG. 4 a tool holder in a side view FIG. 5*a*-5*b* a schematic representation of the method

FIG. 1*a* shows schematically an orientation of cutting inserts 2 on a suggested tool holder 3 relative to a workpiece 1, which would be positioned for a non-inclined spindle axis S. A feed direction F of the cutting insert 2 is indicated by a block arrow. The tool holder 3 has clockwise rotation, see the direction of rotation R. A plane normal N is perpendicular to the machined workpiece surface 4.

For an angle of the spindle axis S to a machined workpiece surface 4 of 90° in the present case, corresponding to a camber or inclination of the spindle axis $\gamma$ relative to the plane normal N of 0°, a theoretical lead angle $\kappa_{th}$ between a main cutting edge 5 and the machined workpiece surface 4 is obtained. Due to the curvature of the main cutting edge 5, the lead angle is determined on the chord of the main cutting edge 5. The chord extends between two ends of a main cutting edge 5.

The lead angle $\kappa_{th}$ shown here is 30°, but this is too large and unsuited to a high feed cutting. The resulting axial cutting depth $a_{p\ th}$ from the lead angle $\kappa_{th}$ is too large to allow high feed rates.

The broken line drawn on the workpiece 1 indicates the cross section of the shaving that will be removed during the next pass of a cutting insert 2.

Figure 1B:
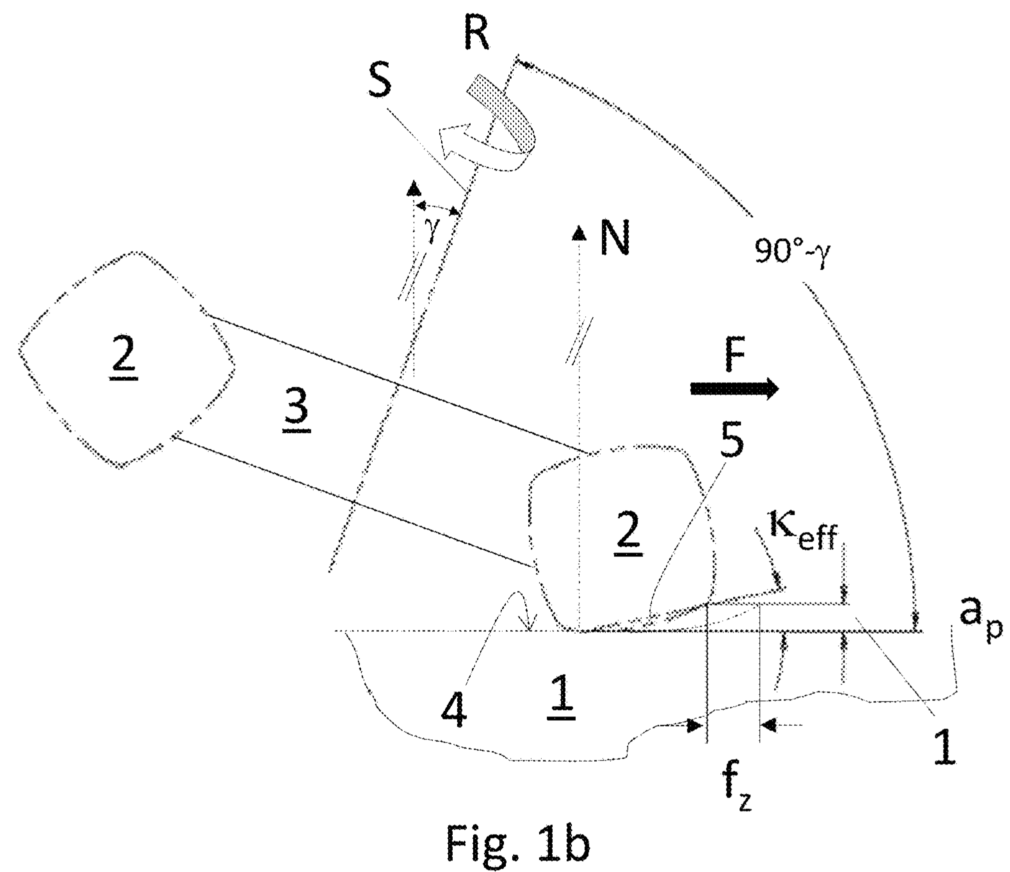

FIG. 1*b* shows a configuration as is provided for the method according to the invention:

The spindle axis S here is inclined at an angle $\gamma$ of around 20° to the plane normal N. Thus, there is an effective lead angle $\kappa_{eff}$ between the main cutting edge 5 and the workpiece surface of 10°.

Owing to the lead angle $\kappa$ being reduced due to the inclination of the spindle axis S, a feed per tooth $f_z$ can be increased. The superimposing of the tool-inherent lead angle $\kappa_{th}$ and the inclination of the spindle axis S at an angle $\gamma$ results in an effective lead angle $\kappa_{eff}$ relative to the machined workpiece surface of $$\kappa_{eff}=\kappa_{th}-\gamma$$

where $\kappa_{th}$ is the theoretical or tool-inherent lead angle.

For curved workpiece surfaces, the plane normal N can be situated at the radially inward point of attack of the particular cutting insert, as shown in FIG. 1*b*.

The values shown here for the angle of inclination $\gamma$ of the spindle axis S and the resulting lead angle $\kappa$ between the main cutting edge 5 and the workpiece surface 4 are exemplary. Preferable values for the angle of inclination $\delta$ of the spindle axis S relative to the plane normal N lie in a range between 3° and 35°, more preferably between 10° and 30°, especially preferably between 15° and 25°.

The effective lead angle $\kappa_{eff}$ between the main cutting edge 5 and the workpiece surface 4 results from the mounting position of the cutting insert 2 on the tool holder 3 and the angle of inclination $\gamma$ of the spindle axis S.

Figure 2:
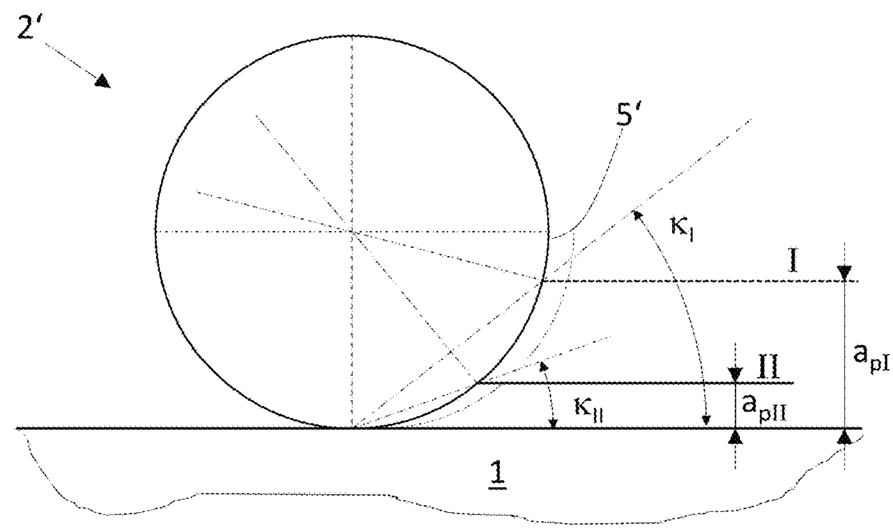

FIG. 2 shows a round cutting insert 2', such as is not provided for the method according to the invention, in engagement with a workpiece 1.

FIG. 2 shows two machining situations:

in configuration I, the cutting insert 2' is used with a large axial cutting depth $a_{pI}$. The result is a large lead angle $\kappa_I$.

in configuration II, the cutting insert 2' is used with a small axial cutting depth $a_{pII}$. The result is a small lead angle $\kappa_{II}$.

For round cutting inserts, the lead angle increases with increasing cutting depth to take on 45° for the maximum cutting depth corresponding to the radius of the round cutting insert. Owing to the circular arc shape of the cutting edge, an actual lead angle of 0° is present at the lowest point and an actual lead angle of 90° is present at the maximum cutting depth corresponding to the radius.

For round cutting inserts, the length of a cutting edge in engagement increases with increasing diameter of the cutting insert for a given cutting depth; the forces on the cutting edge decrease with increasing length.

Since low cutting forces are desirable for high feed cutting, the largest possible diameters are preferred for high feed cutting with round cutting inserts. This also constitutes a significant limitation of round cutting inserts, since a radius of curvature of the cutting edge corresponds to the radius of the geometrical dimension. Thus, a large radius of curvature also means a large indexable insert.

Figure 3A:
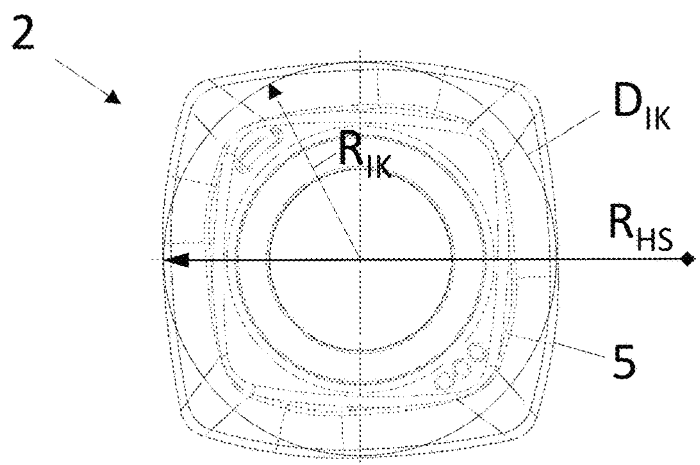
Figure 3B:
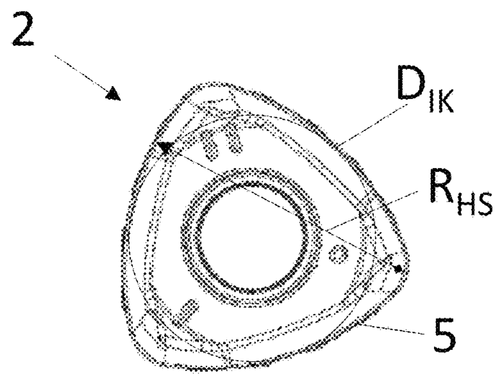
Figure 3C:
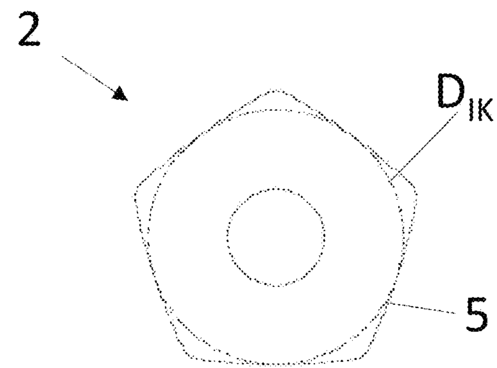

FIGS. 3*a* to 3*c* show schematically substantially polygonal cutting inserts 2, such as are provided for the method according to the invention, in top view.

The cutting insert of FIG. 3*a* is formed with a square base shape (so-called S-plate) with convex rounded outer contour.

Preferably, a cutting edge is formed on each rounded side edge of the cutting insert 2 (the main cutting edge 5 is emphasized here). Thus, in the case of the square base shape, a 4-fold indexable cutting insert is obtained. 4-fold indexable means that four independent main cutting edges 5 can be used for a machining. In this case, a new machining position is adjusted by rotating the cutting insert 2 through 90°. Thus, with a square base shape of the cutting insert 2, four independent main cutting edges 5 are obtained.

To illustrate the shape of the cutting insert 2, an inscribed circle $D_{IK}$ is drawn. A radius of curvature $R_{HS}$ of a main cutting edge 5 is preferably at least 1.5 times greater than the radius of the inscribed circle $D_{IK}$.

Besides the cutting insert 2 shown here with quadrangular base shape, cutting inserts with substantially triangular base shape or pentagonal base shape can also be considered for the method according to the invention.

FIG. 3*b* shows a cutting insert 2 with a substantially triangular base shape (a so-called T-plate).

FIG. 3*c* shows a cutting insert 2 with a substantially pentagonal base shape (a so-called P-plate).

Here as well, as a distinction from round cutting inserts, a radius of curvature of a main cutting edge is at least 1.5 times greater than a radius $R_{IK}$ of an inscribed circle $D_{IK}$.

For the method according to the invention, quadrangular plates (S-plates) had the most favorable ratio of usable cutting depth and number of indexing positions.

Figure 4:
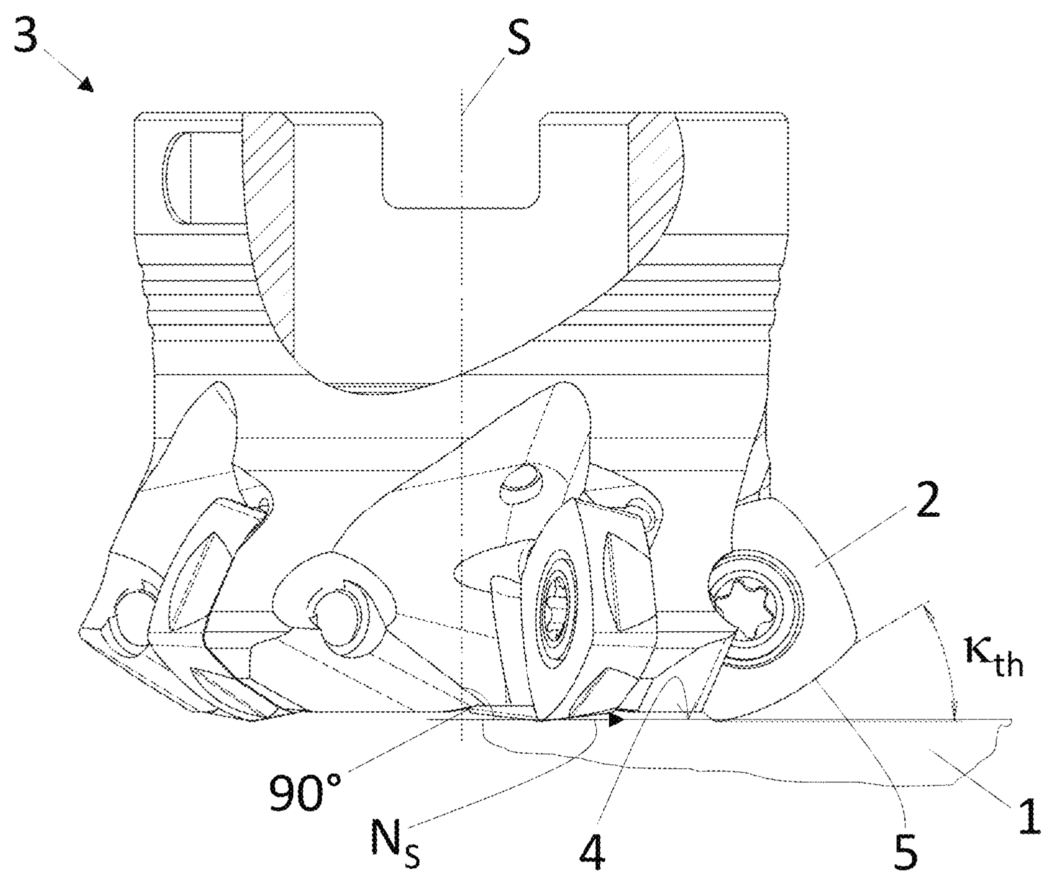

FIG. 4 shows a tool holder 3 with a spindle axis S and a plurality of cutting inserts 2. The tool holder 3 is adjusted with respect to a machined workpiece surface 4 such that the spindle axis S stands perpendicular to a machined workpiece surface 4.

A cutting insert 2 is mounted in the tool holder 3 in such a way that a theoretical lead angle $\kappa_{th}$ between 20° and 40° exists between a normal $N_S$ to the spindle axis S and a main cutting edge 5 of the cutting insert 2. The mounting position of the cutting insert 2 produces in the tool holder 3 a theoretical (tool-inherent) lead angle $\kappa_{th}$ between a main cutting edge 5 and a machined workpiece surface 4. The lead angle $\kappa_{th}$ shown here, however, would be too large and thus unsuited for a high feed cutting.

Figure 5A:
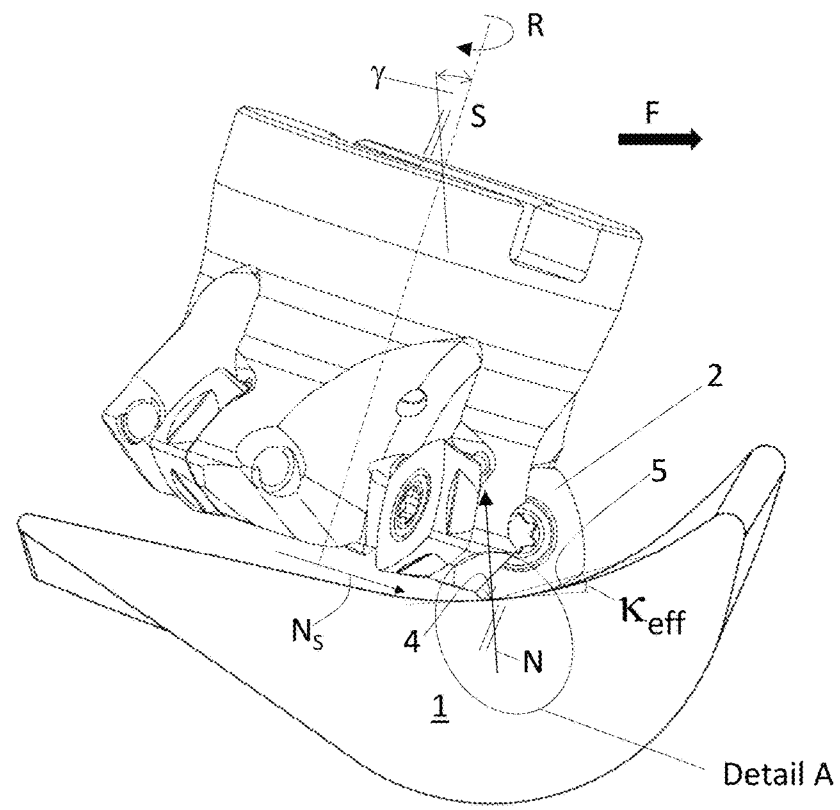
Figure 5B:
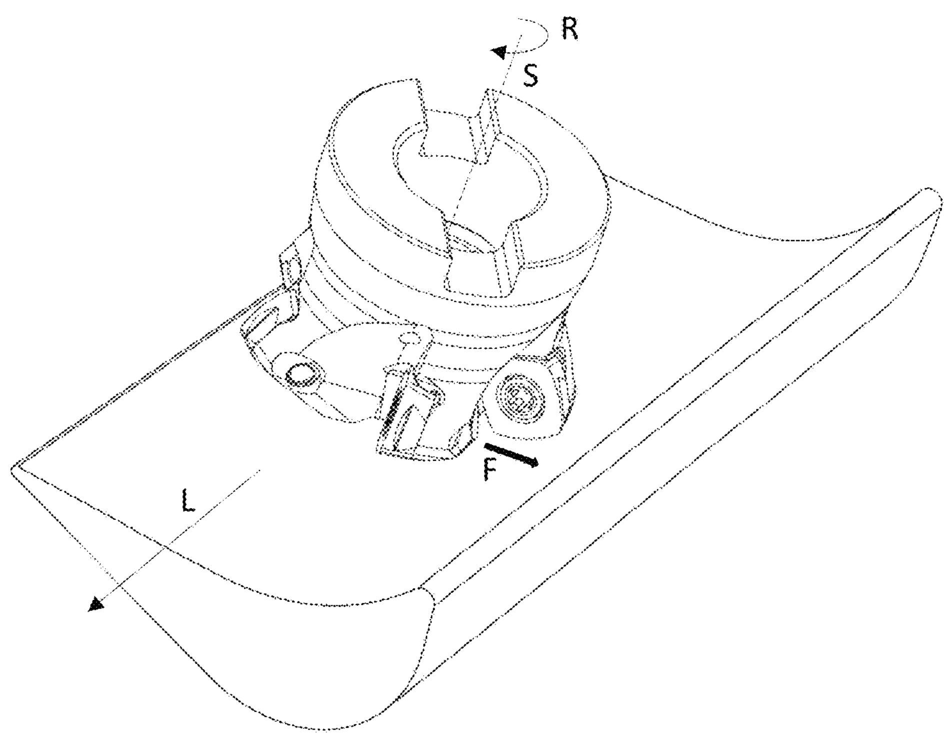

Only owing to the method according to the invention, as illustrated in FIGS. 5*a* and 5*b*, can the configuration of tool holder 3 and cutting inserts 2 shown in FIG. 4 be used for a high feed cutting.

FIG. 5*a* and FIG. 5*b* show representations of the method according to the invention for the milling of a workpiece 1, here, a turbine blade, in different views.

A tool holder 3 comprises a plurality of substantially polygonal cutting inserts 2. In the present exemplary embodiment, the cutting inserts 2 have a square base shape. The spindle axis S of the tool holder 3 takes on an angle γ greater than 0° with respect to the plane normal N to the machined workpiece surface 4. Preferable values for the angle of inclination γ of the spindle axis S lie in a range between 3° and 35°, more preferably between 10° and 30°, especially preferably between 15° and 25°. In the side view of FIG. 5*a* it can be seen that the angle γ in the present example is around 20°. The angle γ is measured as positive in the feed direction F.

The effective lead angle $\kappa_{eff}$ between a main cutting edge 5 of the cutting insert 2 and the machined workpiece surface 4 resulting from the inclination of the spindle axis S and the mounting position of a cutting insert 2 on the tool holder 3 is between 5° and 20°. In the present example, the effective lead angle $\kappa_{eff}$ is around 12°.

As a reference for the angle values with respect to the machined workpiece surface 4, the radially inward point of attack of the cutting insert 2 in engagement is used (Detail A).

The method allows a milling with high feeds. Typical values which are achieved in the method according to the invention are $f_z$ 0.60-0.90 mm/tooth. When using round plates of the prior art, on the contrary, only lower feeds of around 0.35-0.45 mm/tooth are possible.

A further benefit in the use of polygonal cutting inserts is that greater cutting depths can also be realized, when a machining situation requires this: thus, for example, a cutting depth down to 5 mm is possible with reduced feed rates and without a tool change. Such cutting depths could not be created with round plates.

FIG. 5*b* shows the method in a perspective representation. Preferably the feed direction F is substantially normal to a longitudinal axis L of the turbine blade, as can be seen from FIG. 5*b*.

The invention claimed is:

1. A method for milling a turbine blade, the method comprising:

providing at least one substantially polygonal cutting insert arranged in a tool holder, the tool holder having a spindle axis and the cutting insert having a main cutting edge, the at least one cutting insert is a substantially triangular indexable cutting insert or a substantially quadrangular indexable cutting insert or a substantially pentagonal indexable cutting insert, with the cutting insert inserted in the tool holder with a theoretical lead angle between a normal to the spindle axis and the main cutting edge of the cutting insert to between 20° and 40°;

milling the turbine blade with the cutting insert held in the tool holder with a feed, simultaneous to a rotation of the tool holder about the spindle axis, in a feed direction oblique to the spindle axis of the tool holder and transverse to a plane normal of a machined turbine blade surface, and thereby:

inclining the spindle axis for setting the spindle axis of the tool holder to enclose an angle of between 3° and 35° with a surface normal of the machined turbine blade surface and for setting an effective lead angle between a main cutting edge of the cutting insert and the machined turbine blade surface to lie between 5° and 20°.

2. The method according to claim 1, which comprises setting an axial cutting depth to less than 3.0 mm.

3. The method according to claim 1, which comprises setting a feed per tooth between 0.60 and 0.90 mm.

* * * * *